(12) United States Patent
Awadi et al.

(10) Patent No.: US 10,858,004 B2
(45) Date of Patent: Dec. 8, 2020

(54) METHODS AND SYSTEMS FOR IMPROVING AUTOMATIC ENGINE STOPPING AND STARTING

(71) Applicant: Ford Global Technologies, LLC, Dearborn, MI (US)

(72) Inventors: Ahmed Awadi, Farmington Hills, MI (US); Andrew Moen, Canton, MI (US); Siraj Siddiqui, Lasalle (CA); Hafiz Khafagy, Dearborn, MI (US); Hussam Makkiya, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 15/960,125

(22) Filed: Apr. 23, 2018

(65) Prior Publication Data
US 2019/0322279 A1 Oct. 24, 2019

(51) Int. Cl.
*B60W 30/18* (2012.01)
*B60W 10/06* (2006.01)
*B60W 10/11* (2012.01)

(52) U.S. Cl.
CPC ...... *B60W 30/18027* (2013.01); *B60W 10/06* (2013.01); *B60W 10/11* (2013.01); *B60W 30/18054* (2013.01); *B60W 2510/1005* (2013.01); *B60W 2520/105* (2013.01); *B60W 2540/106* (2013.01); *B60W 2540/12* (2013.01); *B60W 2710/0677* (2013.01); *B60W 2710/1005* (2013.01); *B60W 2720/106* (2013.01)

(58) Field of Classification Search
CPC ..... B60W 30/18027; B60W 30/18054; B60W 2510/1005; B60W 2520/105; B60W 2540/106; B60W 2540/12; B60W 2710/0677; B60W 2710/1005; B60W 2720/106
See application file for complete search history.

(56) References Cited

U.S. PATENT DOCUMENTS

| 6,142,909 | A * | 11/2000 | Drexl ................... B60W 10/02 477/91 |
| 6,449,572 | B1 | 9/2002 | Kurz et al. |
| 8,157,035 | B2 | 4/2012 | Whitney et al. |
| 9,604,635 | B1 | 3/2017 | Johri et al. |
| 2006/0049691 | A1* | 3/2006 | Deprez ..................... B60T 7/00 303/191 |
| 2011/0153127 | A1 | 6/2011 | Weslati et al. |
| 2014/0343830 | A1* | 11/2014 | Elwart ................ F02N 11/0837 701/112 |
| 2016/0347314 | A1* | 12/2016 | Kuwahara ........... B60W 30/182 |
| 2018/0056978 | A1* | 3/2018 | Hata ..................... B60W 10/06 |
| 2018/0057001 | A1* | 3/2018 | Hu .................... B60W 50/0097 |
| 2019/0093760 | A1* | 3/2019 | Morgen .......... B60W 30/18027 |
| 2019/0155279 | A1* | 5/2019 | Tayama ................ B60W 50/14 |
| 2019/0204823 | A1* | 7/2019 | Meier .................. G05D 1/0011 |

* cited by examiner

*Primary Examiner* — Tisha D Lewis
(74) *Attorney, Agent, or Firm* — Geoffrey Brumbaugh; McCoy Russell LLP

(57) ABSTRACT

Systems and methods for improving operation of a vehicle that includes an engine that may be automatically stopped and started are presented. In one example, vehicle launch control parameters are adjusted responsive to a learned driving style. The approach may provide vehicle launches that are closer to driver expectations than vehicle launches that are based solely on accelerator pedal position.

12 Claims, 7 Drawing Sheets

METHODS AND SYSTEMS FOR IMPROVING AUTOMATIC ENGINE STOPPING AND STARTING

FIELD

The present description relates to a system and methods for improving vehicle drivability. The methods may be particularly useful for engines that are frequently stopped and restarted to conserve fuel.

BACKGROUND AND SUMMARY

A vehicle may include an engine that is automatically stopped without a driver providing input to a device that has a sole purpose or function of stopping engine rotation so that fuel may be conserved. Fuel consumption may be reduced at a time where engine efficiency may be less than is desired by stopping the engine. The engine may be automatically restarted after it is automatically stopped to allow the vehicle to continue on its travel route. If the vehicle's driver requests a large amount of torque while the engine is being started or running up to speed, vehicle acceleration may be disappointing to the driver when engine torque and driveline torque transfer are restrained to control driveline noise and vibration. On the other hand, if engine torque increases at a fast rate and the vehicle's driveline accelerates the vehicle at a high rate for a constrained driver demand torque, engine and driveline noise may be greater than the vehicle's driver expects. Thus, operation of a vehicle after an automatic engine stop may affect vehicle drivability and a driver's perception of the vehicle's refinement. Accordingly, is may be desirable to provide a vehicle launch that more closely conforms to a driver's expectations.

The inventors herein have recognized the above-mentioned disadvantages and have developed a method for operating a vehicle, comprising: adjusting launch of a vehicle, including transmission gear selection, via a learned driver behavior and an identified present vehicle driver.

By adjusting one or more vehicle launch control parameters via a learned driver behavior and an identified present vehicle driver, it may be possible to provide the technical result of improving vehicle launch and conforming vehicle launch to driver expectations. In one example, a driving style of the vehicle's driver may be determined responsive to conditions that occurred during prior vehicle launches. In particular, the driving style may be manifest as a numeric value that is based on average values of rate of accelerator pedal application and vehicle acceleration. The average values may then be modified by weighting factors and a sum of the weighting factors multiplied by the average values is used to describe a driving style. Higher numeric values may be used to indicate a more aggressive driving style and lower numeric values may be used to indicate a more subdued driving style. The type of driving style may then be the basis for selecting vehicle launch control parameters that are applied during an automatic engine start and vehicle launch. In this way, a driving style of a driver may be learned and applied to operate a vehicle so that a driver's expectations may be more closely met.

The present description may provide several advantages. Specifically, the approach may improve vehicle drivability. Further, the approach may improve driver and passenger comfort. In addition, the approach may provide unique vehicle driving experiences to each vehicle driver.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
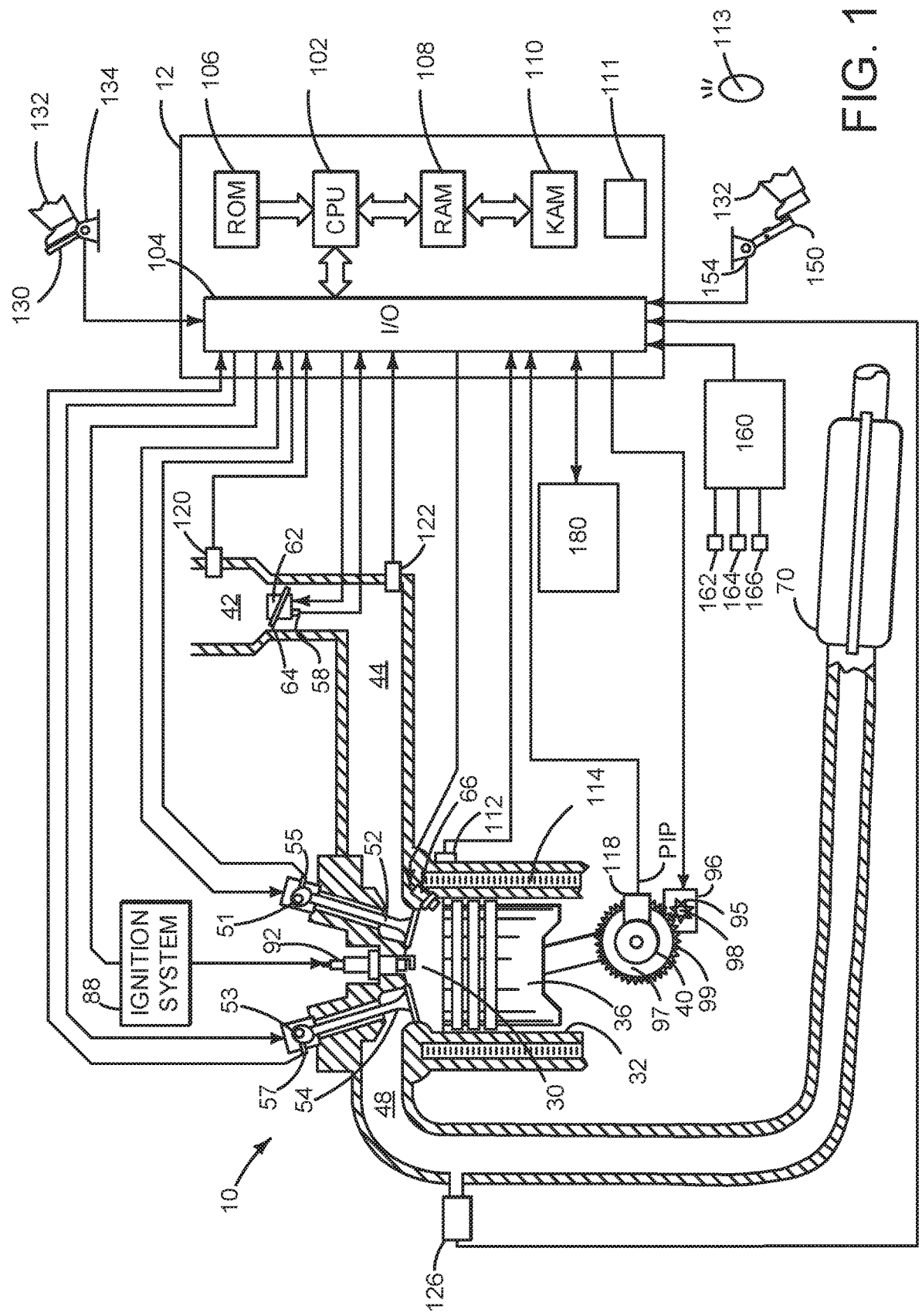
FIG. 1 is a schematic diagram of an engine.
Figure 2:
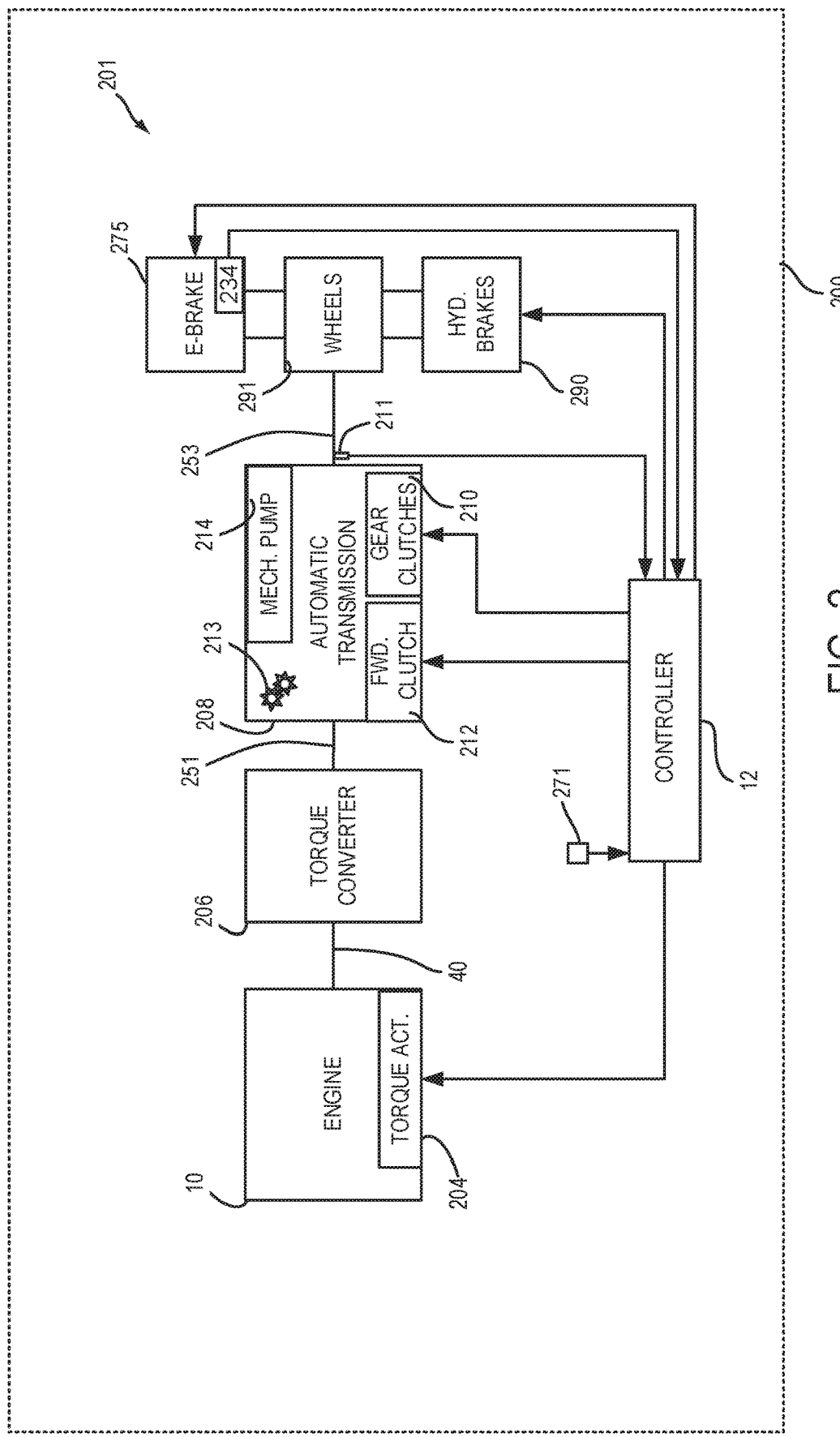
FIG. 2 shows an example vehicle driveline including the engine of FIG. 1.

The present description is related to controlling engine and driveline operation of a vehicle. The vehicle may include an engine as a sole source of torque for propelling the vehicle. Alternatively, the vehicle may include an engine and a motor that both supply torque to propel the vehicle. FIG. 1 shows an example engine system. The vehicle may include a driveline with a transmission as is shown in FIG. 2. The engine and driveline may be operated during a launch after an automatic engine stop in response to learned driver behavior that is based on one or more control parameters as is shown in FIGS. 3-8. The driveline and engine may operate according to the sequence of FIG. 9 via the method of FIG. 10 and the system of FIG. 1.

Referring to FIG. 1, internal combustion engine 10, comprising a plurality of cylinders, one cylinder of which is shown in FIG. 1, is controlled by electronic engine controller 12. The controller 12 receives signals from the various sensors of FIGS. 1 and 2. The controller 12 also employs the various actuators of FIGS. 1 and 2 to operate and adjust operation of engine 10 based on the received signals and instructions stored within memory of controller 12. For example, controller 12 receives engine position data from sensor 118 and adjusts fuel injector timing and spark timing responsive to engine position according to data maps stored in controller 12.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. A high pressure, dual stage, fuel system (not shown) provides fuel to fuel injector 66. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, executable instructions stored in non-transitory read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive engine torque and vehicle braking instructions from autonomous driver 160. Camera 162, range sensing device 164 (e.g., LIDAR, RADAR, SONAR, etc.), and global positioning receiver 166 along with other sensors may provide input to autonomous driver 160 to indicate conditions surrounding the vehicle 200 that is shown in FIG. 2. Autonomous driver 160 may comprise a controller, instructions, memory, and signal interface circuitry. Controller 12 may also receive data from and provide data to interface 180. In some instances interface 180 may operate as a human/machine interface. Additionally, interface 180 may operate as a machine to machine interface. For example, interface 180 may receive manual input from a human or data from a remote host server. Interface 180 may also display data from controller 12 via a display panel.

Controller 12 may also determine an identity of a human driver via a unique data code or key that is transmitted by key fob 113 and received by controller 12 at receiver 111. The unique data that is transmitted to controller 12 allows controller 12 to determine which weighted driving style parameter is associated or belongs to which human driver. A plurality of key fobs may each transmit unique data sets to controller 12 that are associated with unique human drivers so that unique vehicle launch control parameters may be activated for each individual driver.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for a vehicle system, comprising: a vehicle including an engine; and a controller including non-transitory instructions executable to adjust vehicle launch control parameters responsive to a type of autonomous vehicle delivery, and to launch the vehicle responsive to the vehicle launch control parameters. The vehicle system includes where the type of autonomous vehicle delivery type is time sensitive package delivery of inanimate objects, and where adjusting the vehicle launch control parameters increases a rate of vehicle acceleration. The vehicle system includes where the type of autonomous vehicle delivery type is delivery of human passengers, and where adjusting the vehicle launch control parameters decreases a rate of vehicle acceleration. The vehicle system includes where the vehicle launch control parameters include transmission gear and spark timing. The vehicle system further comprises additional instructions to automatically stop and start the engine. The vehicle system further comprises instructions to adjust the vehicle launch control parameters responsive to a learned driving style, where the learned driving style is a weighted function of a plurality of parameters.

Referring now to FIG. 2, an example vehicle 200 that includes a driveline 201 is shown. Vehicle driveline 201 includes engine 10 as shown in greater detail in FIG. 1. Engine 10 may include one or more torque actuators 204. Torque actuator 204 may be an engine throttle, variable camshaft, fuel injector, ignition system, or other device that may affect engine torque. Engine torque may be increased or decreased via operating the torque actuator.

Engine 10 provides torque to torque converter 206 via crankshaft 40. Torque converter 206 hydraulically couples engine 10 to transmission input shaft 251. Automatic transmission 208 includes a forward clutch 212 and gear clutches 210. Mechanical pump 214 supplies pressurized transmission fluid to torque converter 206, gear clutches 210, and forward clutch 212. Gear clutches 210 may be applied and released to engage and disengage gears 213 (e.g., 1-10). Vehicle speed may be determined via transmission output shaft speed sensor 211.

Driveshaft 253 directs torque from transmission 208 to vehicle wheels 291. Force may be supplied to vehicle wheels via hydraulic brakes 290, or optionally, electrically operated brakes 235. Electrically operated brakes 275 may be operated as parking brakes or holding brakes when vehicle 200 is desired to be held in a stopped state. Hydraulic brakes 290 may be applied while vehicle 200 is moving, is desired to be held in a stopped state, and as holding or parking brakes. Additionally, hydraulic brakes 290 and electric brake 275 may be applied when inclinometer 271 indicates a road grade greater than a threshold road grade when vehicle 200 is stopped.

Figure 3:
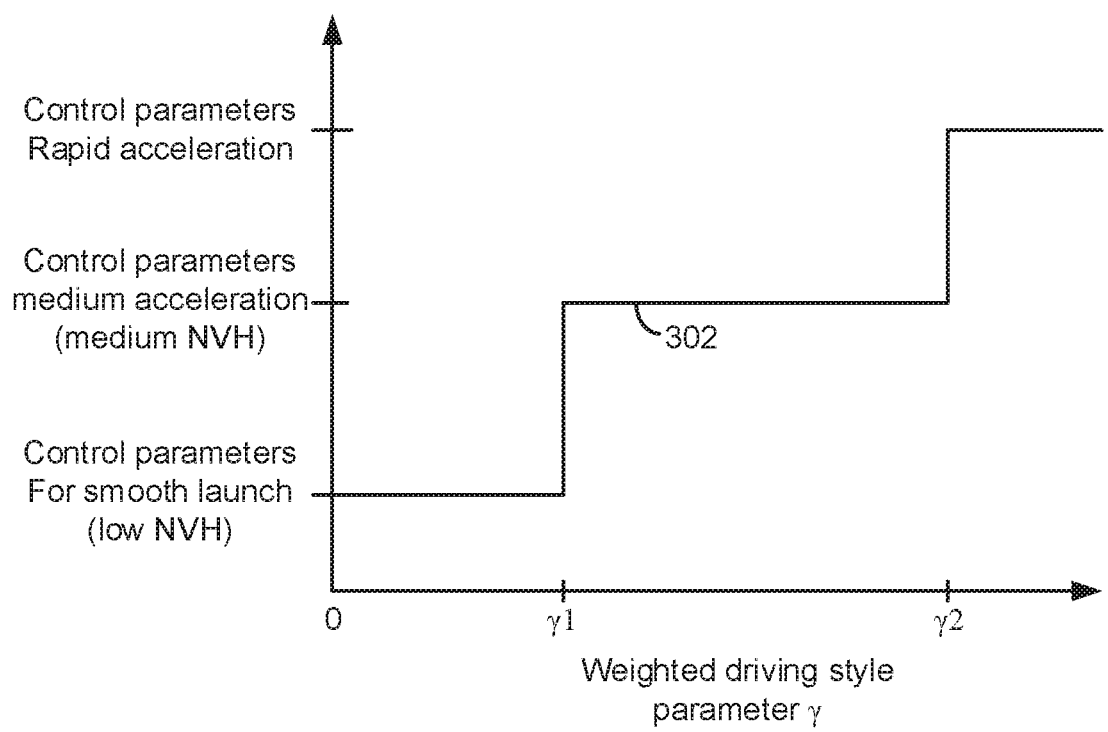
FIGS. 3-8 show an example parameters that form a basis for a driver's driving style.

Referring now to FIG. 3, an example plot of how vehicle launch control parameters (e.g., engine spark timing, engaged transmission gear, cam timing, fuel injection timing, etc.) may be selected via a weighted driving style parameter $\gamma$ is shown. The value of $\gamma$ may be determined as is described in the method of FIG. 9.

The horizontal axis represents the weighted driving style parameter $\gamma$, and the value of the weighted driving style parameter $\gamma$ increases from the left side of the plot to the right side of the plot. The vertical axis represents groups of vehicle launch control parameters that are activated during a vehicle launch after an automatic engine stop and vehicle stop. In this example, three groups of vehicle launch control parameters are provided to operate the engine and driveline during a vehicle launch that immediately follows an automatic engine stop. A first group of vehicle launch control parameters provides for a smooth vehicle launch and this group of control parameters may include engaging the transmission in third gear during launch, retarding spark timing from minimum spark timing for best engine torque (MBT) by ten or more crankshaft degrees, and retarding start of fuel injection timing from a base fuel injection timing by a first amount. A second group of vehicle launch control parameters provides for a medium acceleration vehicle launch and this group of control parameters may include engaging the transmission in second gear during launch, retarding spark timing from MBT timing by between five and ten crankshaft degrees, and retarding start of fuel injection timing from a base fuel injection timing by a second amount, the second amount less than the first amount. A third group of vehicle launch control parameters provides for a rapid acceleration vehicle launch and this group of control parameters may include engaging the transmission in first gear during launch, spark timing at MBT minimum spark timing, and start of fuel injection timing at base fuel injection timing. It should be appreciated that the values of control parameters in the three control groups described here and non-limiting and only exemplary in nature. Further, although three vehicle launch control parameters are described here, fewer or more groups may be provided.

Trace 302 describes an example relationship between the weighted driving style parameter value $\gamma$ and the vehicle launch control parameter group that is activated during an engine start and vehicle launch that immediately follows (e.g., no intervening engine stops or starts) an automatic engine stop during which vehicle speed is zero. Note that that the duration of the engine stop period after the engine stop may be long or short and it may not affect the group of vehicle launch control parameters that are selected and activated.

Trace 302 indicates that the first group of vehicle launch control parameters is selected and activated during a vehicle launch that immediately follows an automatic engine stop and vehicle zero speed condition when the value of the weighted driving style parameter $\gamma$ is between 0 and $\gamma 1$. A weighted driving style parameter $\gamma$ value of between 0 and $\gamma 1$ is indicative of a driver that often requests refined and deliberate vehicle launches that may be characterized as slow acceleration vehicle launches.

A second group of vehicle launch control parameters is selected and activated during a vehicle launch that immediately follows an automatic engine stop and vehicle zero speed condition when the value of the weighted driving style parameter $\gamma$ is between $\gamma 1$ and $\gamma 2$. A weighted driving style parameter $\gamma$ value of between $\gamma 1$ and $\gamma 2$ is indicative of a driver that often requests moderate levels of vehicle acceleration after conditions of an automatic engine stop and zero vehicle speed occur.

A third group of vehicle launch control parameters is selected and activated during a vehicle launch that immediately follows an automatic engine stop and vehicle zero speed condition when the value of the weighted driving style parameter is greater than $\gamma 2$. A weighted driving style parameter $\gamma$ value of greater than $\gamma 2$ is indicative of a driver that often requests higher levels of vehicle acceleration after conditions of an automatic engine stop and zero vehicle speed occur.

In this way, a value of a weighted driving style parameter $\gamma$ may be the basis for selecting and activating vehicle launch control parameters. In other examples, specific values of launch control parameters may be adjusted responsive to the weighted driving style parameter $\gamma$. For example, an amount of spark retard from MBT $\zeta$ (e.g., a numeric value) that is applied during a vehicle launch after an automatic engine stop and zero vehicle speed may be a function of the weighted driving style parameter $\gamma$. Spark timing during a vehicle launch after an automatic engine stop and zero vehicle speed may be adjusted by subtracting $\zeta$ from MBT spark timing.

Figure 4:
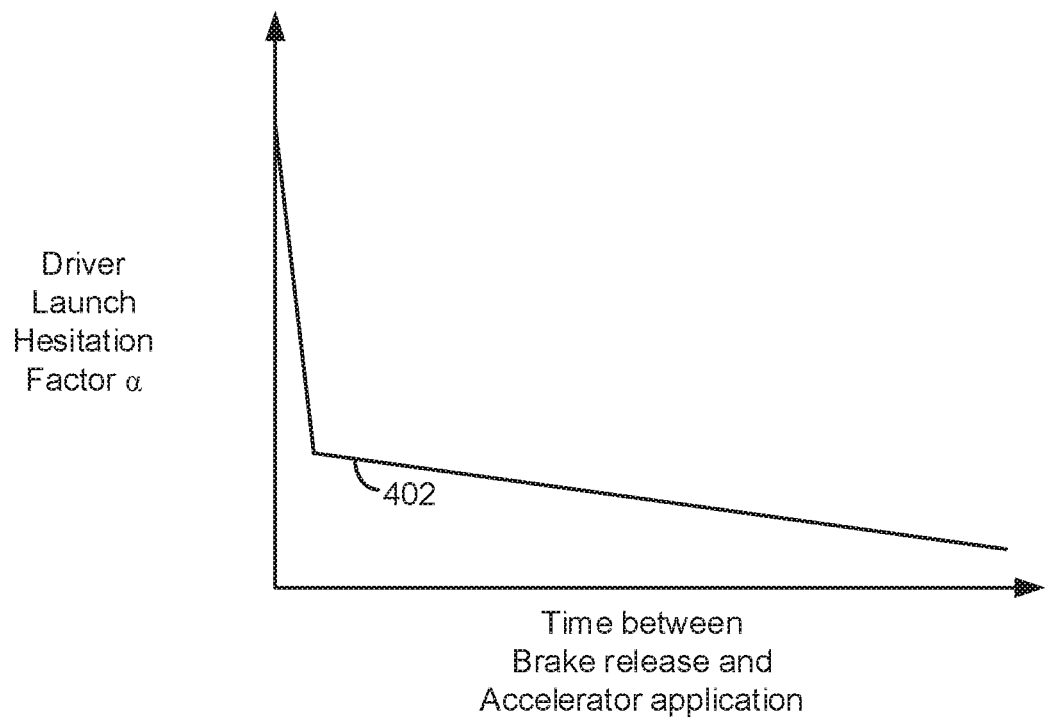

Referring now to FIG. 4, a plot of how an amount of time after a brake pedal is released and up to a time an accelerator pedal is first applied (e.g., an amount of time between brake pedal release and accelerator pedal application) after the brake pedal is released after conditions of an automatic engine stop and zero vehicle speed were met affects a value of a driver launch hesitation factor is shown. The driver launch hesitation factor is one of a plurality of variables or parameters that are included to determine the weighted driving style parameter γ.

The horizontal axis represents the amount of time after a brake pedal is released and up to a time an accelerator pedal is applied, and the an amount of time after a brake pedal is released and up to a time an accelerator pedal is applied increases from the left side of the plot to the right side of the plot. The vertical axis represents the driver launch hesitation factor and the value of the driver launch hesitation factor increases in the direction of the vertical axis arrow.

Trace 402 describes an example relationship between the amount of time after a brake pedal is released and up to a time an accelerator pedal is first applied after the brake pedal was released, the brake pedal being released after conditions of an automatic engine stop and zero vehicle speed were met, and the driver launch hesitation factor. In this example, the driver launch hesitation factor value decreases as the time between when the brake pedal is released and the time the accelerator pedal is applied a first time following the brake pedal release. The greater the amount of time between when the brake pedal is released and the application of the accelerator pedal may be an indication of driver's intent to accelerate slowly. On the other hand, the shorter the amount of time between when the brake pedal is released and the application of the accelerator pedal may be an indication of driver's intent to accelerate rapidly. Accordingly, a larger value of the driver's launch hesitation factor increases the weighted driving style parameter γ more than a smaller value of the driver's launch hesitation factor.

In this way, timing between brake pedal release, after conditions of an automatic engine stop and zero vehicle speed are met, and a first application of an accelerator pedal after the brake release may be indication of a driver's sense of urgency to accelerate a vehicle. The timing may then be applied to increase or decrease a value of a weighted driving style parameter γ, thereby modifying vehicle launch characteristics.

Figure 5:
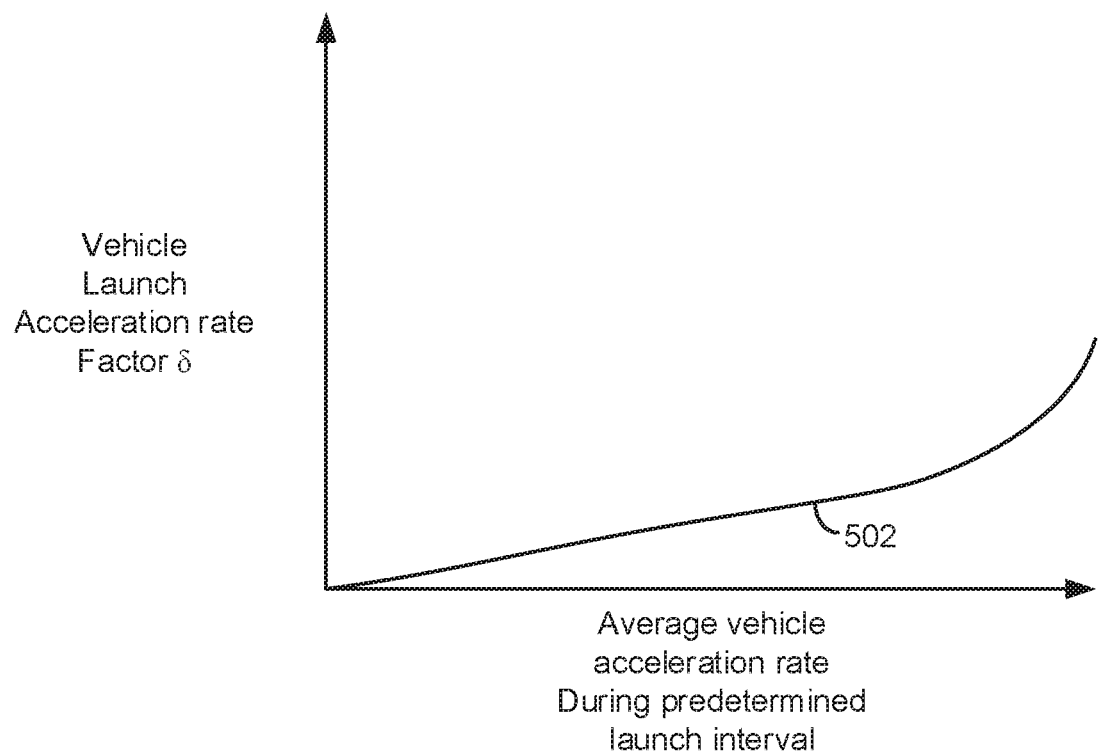

Referring now to FIG. 5, a plot of how an average vehicle acceleration rate during vehicle launch affects a value of a driver launch acceleration rate factor is shown. The vehicle launch follows conditions of zero vehicle speed and an automatic engine stop being met. The driver launch acceleration rate factor is one of a plurality of variables or parameters that are included to determine the weighted driving style parameter γ.

The horizontal axis represents an average vehicle acceleration rate during vehicle launch, and the average vehicle acceleration rate increases from the left side of the plot to the right side of the plot. The vehicle launch occurs immediately (e.g., no intervening engine stops or starts) after conditions of an automatic engine stop and zero vehicle speed have been met. The vertical axis represents the driver launch acceleration rate factor and the driver launch acceleration rate factor increases in the direction of the vertical axis arrow.

Trace 502 describes an example relationship between an average vehicle acceleration rate during a vehicle launch and the driver launch acceleration rate factor. The vehicle launch occurs immediately (e.g., no intervening engine stops or starts) after conditions of an automatic engine stop and zero vehicle speed have been met. In this example, the driver launch acceleration rate factor value increases as the average vehicle acceleration rate increases. Thus, if the average vehicle acceleration rate is high, the driver launch rate factor is higher. Accordingly, a larger value of the average vehicle acceleration rate increases the weighted driving style parameter γ more than a smaller value of the average vehicle acceleration rate.

In this way, average vehicle acceleration rate may be an indication of a driver's sense of urgency to accelerate a vehicle. The average vehicle acceleration rate may then be applied to increase or decrease a value of a weighted driving style parameter γ, thereby modifying vehicle launch characteristics.

Figure 6:
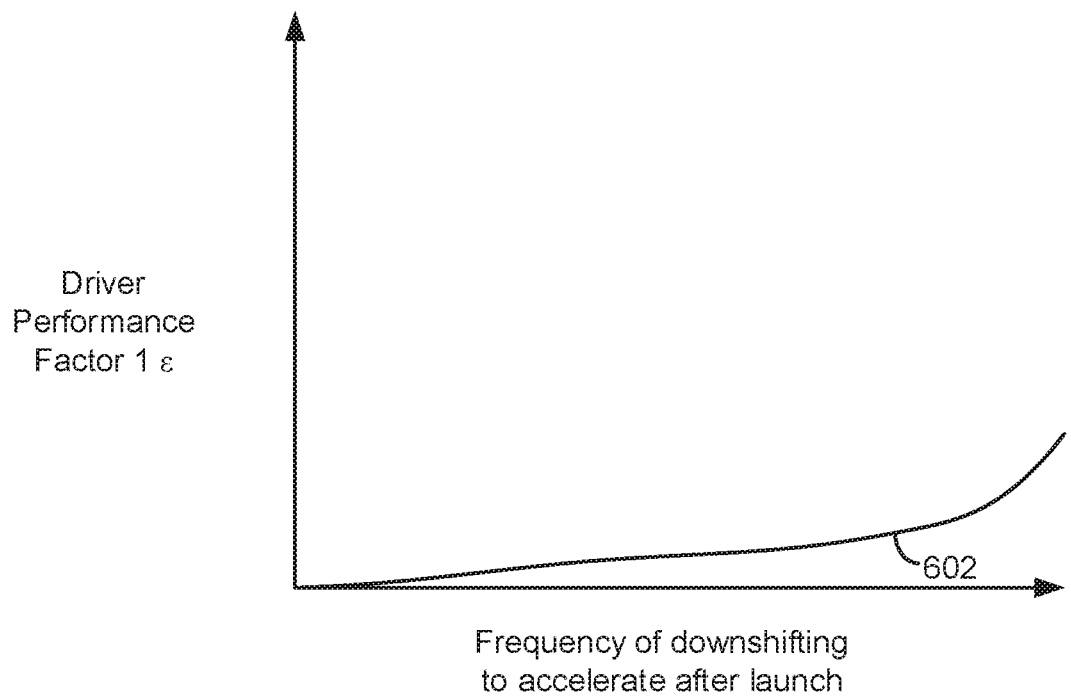

Referring now to FIG. 6, an example plot is shown of how a frequency of downshifting a transmission during vehicle acceleration after vehicle launch affects a value of a driver performance factor. The driver performance factor is one of a plurality of variables or parameters that are included to determine the weighted driving style parameter γ.

The horizontal axis represents a frequency of downshifting a transmission to accelerate a vehicle after a vehicle launch and the frequency of downshifting to accelerate a vehicle after the vehicle launch increases from the left side of the plot to the right side of the plot. The vertical axis represents the driver performance factor and the driver performance factor increases in the direction of the vertical axis arrow.

Trace 602 describes an example relationship between a frequency of downshifting a transmission to accelerate a vehicle after a vehicle launch and the driver performance factor. In this example, the driver performance factor value increases as the frequency of downshifting to accelerate a vehicle after a vehicle launch increases. Thus, if the frequency of downshifting to accelerate a vehicle after a vehicle launch is high, the driver performance factor is higher. Accordingly, a larger value of the frequency of downshifting to accelerate a vehicle after a vehicle launch increases the weighted driving style parameter γ more than a smaller value of the frequency of downshifting to accelerate a vehicle after a vehicle launch.

In this way, frequency of downshifting to accelerate a vehicle after a vehicle launch may be indication of a driver's sense of urgency to accelerate a vehicle. The frequency of downshifting to accelerate a vehicle after a vehicle launch may then be applied to increase or decrease a value of a weighted driving style parameter γ, thereby modifying vehicle launch characteristics.

Figure 7:
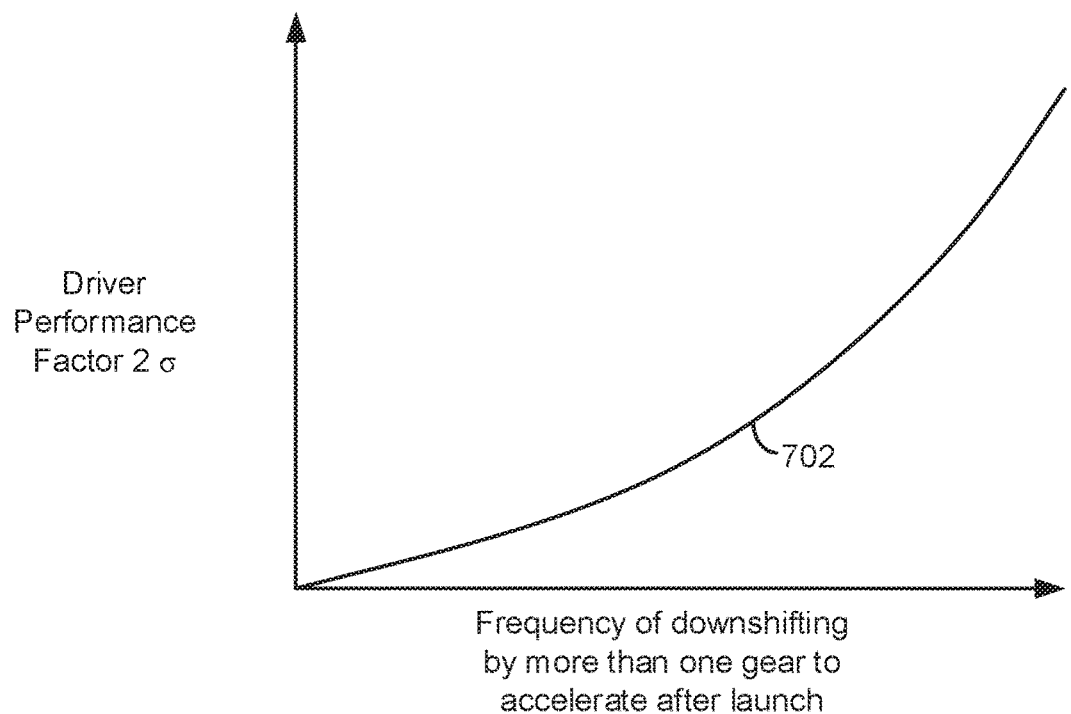

Referring now to FIG. 7, an example plot is shown of how a frequency of downshifting a transmission by more than one gear (e.g., downshifting a transmission from $5^{th}$ gear to $2^{nd}$ gear) during vehicle acceleration after vehicle launch affects a value of a driver performance factor. The driver performance factor is one of a plurality of variables or parameters that are included to determine the weighted driving style parameter γ.

The horizontal axis represents a frequency of downshifting a transmission by more than one gear to accelerate a vehicle after a vehicle launch and the frequency of downshifting the transmission by more than one gear to accelerate a vehicle after the vehicle launch increases from the left side of the plot to the right side of the plot. The vertical axis represents the driver performance factor and the driver performance factor increases in the direction of the vertical axis arrow.

Trace 702 describes an example relationship between a frequency of downshifting a transmission by more than one gear to accelerate a vehicle after a vehicle launch and the driver performance factor. In this example, the driver performance factor value increases as the frequency of downshifting the transmission by more than one gear to accelerate a vehicle after a vehicle launch increases. Thus, if the frequency of downshifting the transmission by more than one gear to accelerate a vehicle after a vehicle launch is high, the driver performance factor is higher. Accordingly, a larger value of the frequency of downshifting the transmission by more than one gear to accelerate a vehicle after a vehicle launch increases the weighted driving style parameter γ more than a smaller value of the frequency of downshifting the transmission by more than one gear to accelerate a vehicle after a vehicle launch.

In this way, frequency of downshifting a transmission by more than one gear to accelerate a vehicle after a vehicle launch may be indication of a driver's sense of urgency to accelerate a vehicle. The frequency of downshifting the transmission by more than one gear to accelerate a vehicle after a vehicle launch may then be applied to increase or decrease a value of a weighted driving style parameter γ, thereby modifying vehicle launch characteristics.

Figure 8:
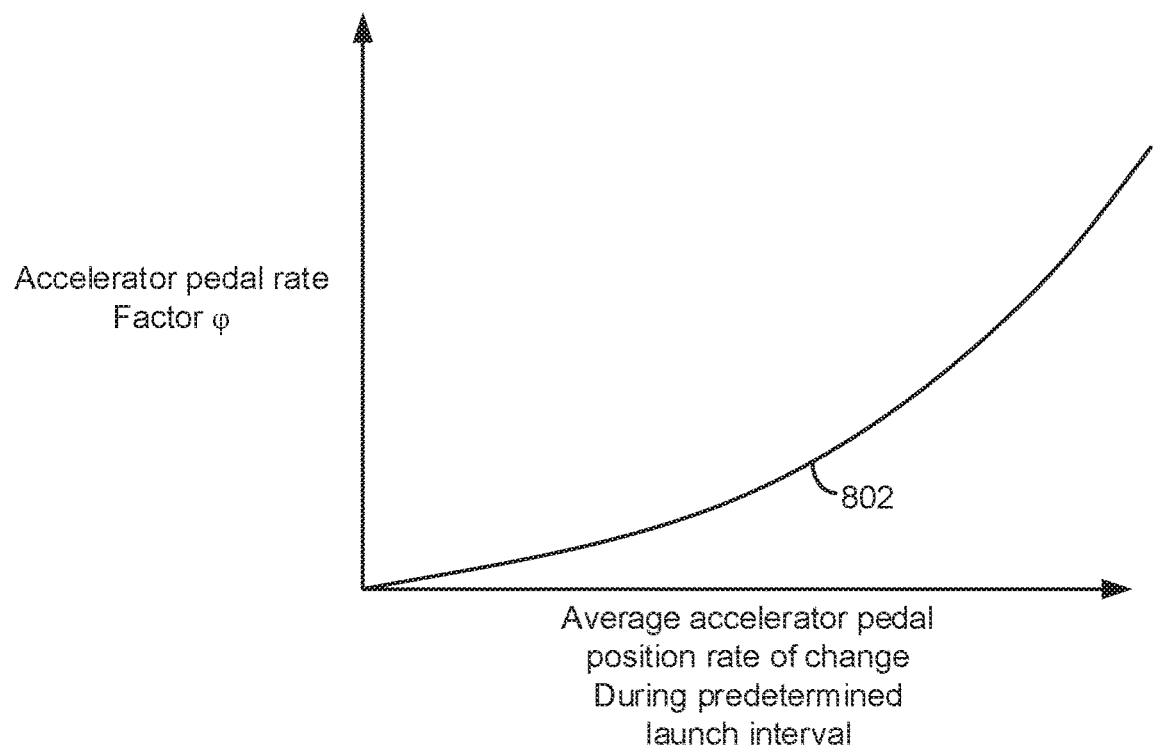

Referring now to FIG. 8, a plot of how an average accelerator pedal position rate of change affects a value of an accelerator pedal rate factor is shown. The accelerator pedal rate factor is one of a plurality of variables or parameters that are included to determine the weighted driving style parameter γ.

The horizontal axis represents an average accelerator pedal position rate of change, and the an average accelerator pedal position rate of change increases from the left side of the plot to the right side of the plot. The vertical axis represents the accelerator pedal rate factor φ and the accelerator pedal rate factor increases in the direction of the vertical axis arrow.

Trace 802 describes an example relationship between an average accelerator pedal position rate of change during a predetermined vehicle launch interval and an accelerator pedal rate factor after conditions of an automatic engine stop and zero vehicle speed were met. In this example, the accelerator pedal rate factor value increases as the average accelerator pedal position rate of change during a predetermined vehicle launch interval increases. Thus, if the average accelerator pedal position rate of change is high, the accelerator pedal rate factor is higher. Accordingly, a larger value of the accelerator pedal rate factor increases the weighted driving style parameter γ more than a smaller value of the accelerator pedal rate factor.

In this way, average accelerator pedal position rate after conditions of an automatic engine stop and zero vehicle speed were met may be indication of a driver's sense of urgency to accelerate a vehicle. The accelerator pedal rate factor may then be applied to increase or decrease a value of a weighted driving style parameter γ, thereby modifying vehicle launch characteristics.

Figure 9:
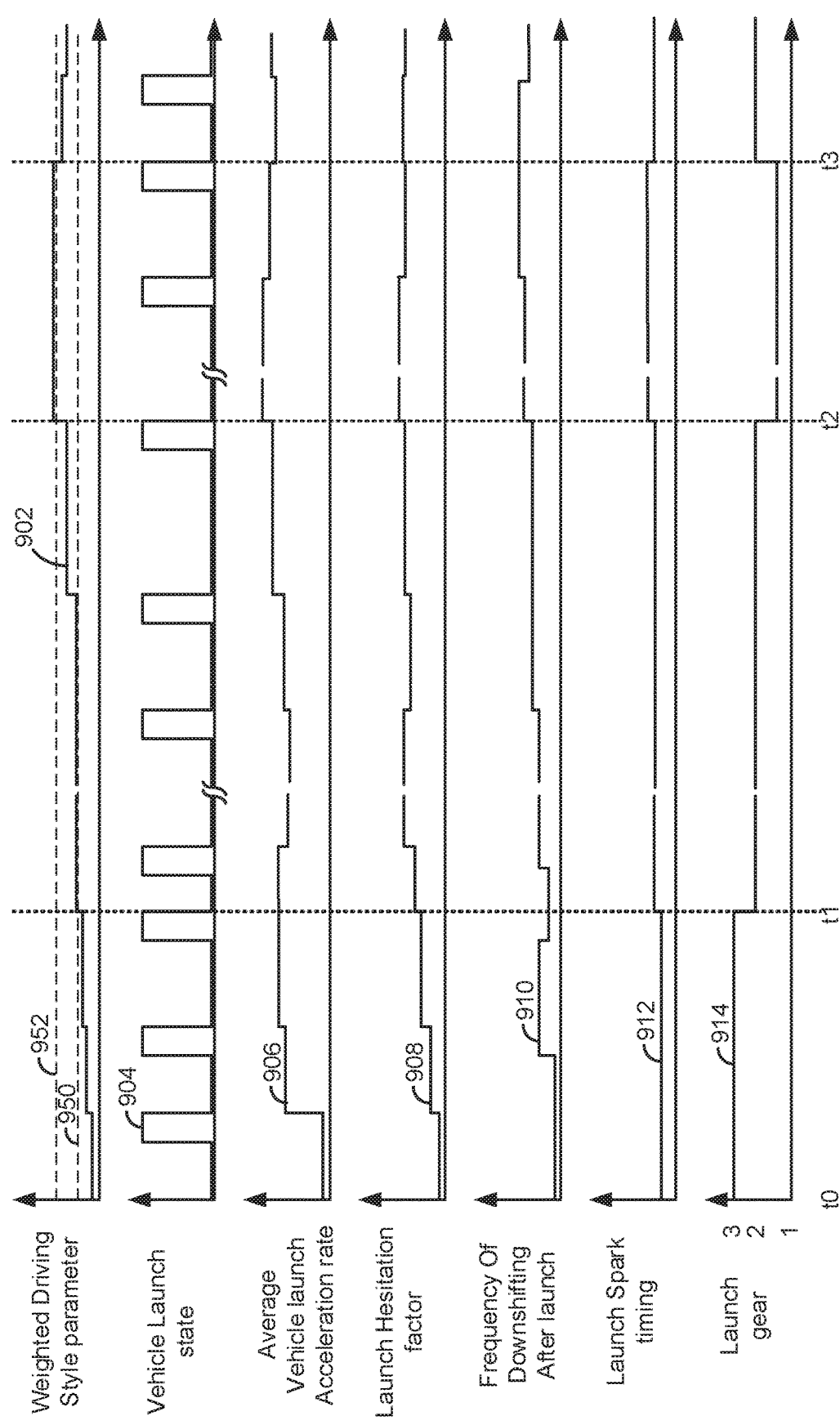
FIG. 9 shows an example vehicle operating sequence.
Figure 10:
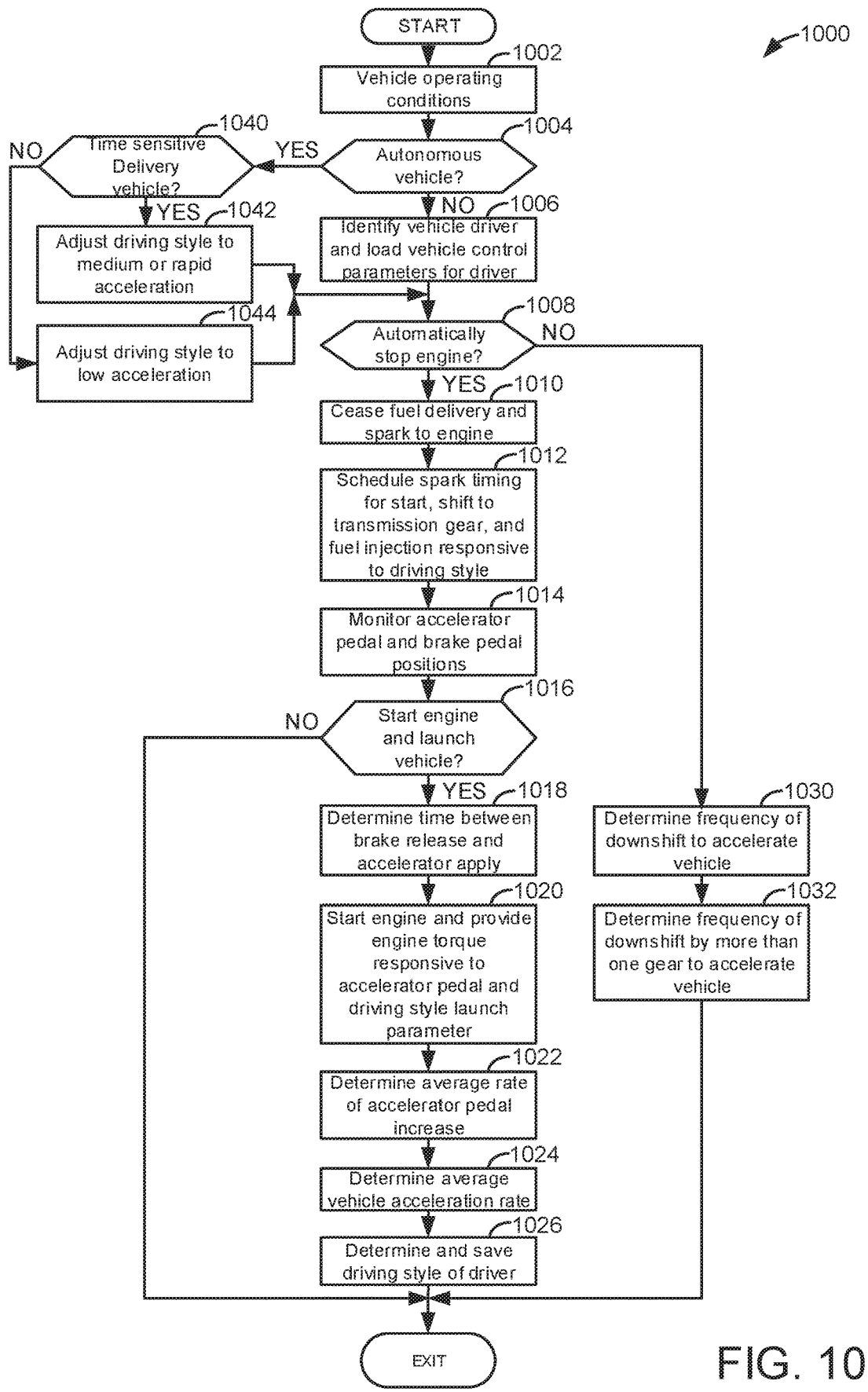
FIG. 10 is an example method for operating a vehicle.

Referring now to FIG. 9, an example prophetic engine operating sequence according to the method of FIG. 10 is shown. The example sequence may be provided via the system of FIG. 1 executing instructions of the method of FIG. 10. Vertical markers t0-t3 represent times of interest during the sequence. The double SS along the horizontal axis of each plots represents a break in time and the break in time may be long or short.

The first plot from the top of FIG. 9 is a plot of a weighted driving style parameter value versus time. The vertical axis represents the weighted driving style parameter value and magnitude of the weighted driving style parameter value increases in the direction of the vertical axis arrow. The horizontal axis represents time and time increases from the left side of FIG. 9 to the right side of FIG. 9. Trace 902 represents the weighted driving style parameter value. Horizontal line 950 represents a first threshold. A first group of control parameters are selected and activated for a smooth vehicle launch when trace 902 is lower than first threshold 950. Horizontal line 952 represents a second threshold. A second group of control parameters are selected and activated for a medium vehicle acceleration level launch when trace 902 is greater than first threshold 950 and less than second threshold 952. A third group of control parameters are selected and activated for a rapid vehicle acceleration launch when trace 802 is greater than second threshold 952.

The second plot from the top of FIG. 9 is a plot of vehicle launch state versus time. The vertical axis represents the vehicle launch state and the vehicle is being launched when trace 904 is at a higher level near the vertical axis arrow. A vehicle launch may occur after conditions of zero vehicle speed and an automatic engine stop occur. The vehicle is not being launched when trace 904 is at a lower level near the horizontal axis. The horizontal axis represents time and time increases from the left side of FIG. 9 to the right side of FIG. 9. Trace 904 represents the vehicle launch state.

The third plot from the top of FIG. 9 is a plot of average vehicle launch acceleration rate versus time. The vertical axis represents the average vehicle launch acceleration rate and the average vehicle launch acceleration rate increases in the direction of the vertical axis arrow. The horizontal axis represents time and time increases from the left side of FIG. 9 to the right side of FIG. 9. Trace 906 represents the average vehicle launch acceleration rate. The average vehicle acceleration rate may be computed by averaging the vehicle acceleration rate when the vehicle is being launched after conditions of zero vehicle speed and an automatic engine stop.

The fourth plot from the top of FIG. 9 is a plot of a launch hesitation factor versus time. The vertical axis represents the launch hesitation factor and a value of the launch hesitation factor increases in the direction of the vertical axis arrow. The horizontal axis represents time and time increases from the left side of FIG. 9 to the right side of FIG. 9. Trace 908 represents the value of the launch hesitation factor.

The fifth plot from the top of FIG. 9 is a plot of frequency of downshifting during vehicle acceleration after vehicle launch versus time. The vertical axis represents frequency of downshifting during vehicle acceleration after vehicle launch and the frequency of downshifting during vehicle acceleration after vehicle launch increases in the direction of the vertical axis arrow. The horizontal axis represents time and time increases from the left side of FIG. 9 to the right side of FIG. 9. Trace 910 represents the frequency of downshifting during vehicle acceleration after vehicle launch.

The sixth plot from the top of FIG. 9 is a plot of launch spark timing (e.g., spark timing of the engine during launch) versus time. The vertical axis represents launch spark timing and the launch spark timing advance increases in the direction of the vertical axis arrow. The horizontal axis represents time and time increases from the left side of FIG. 9 to the right side of FIG. 9. Trace 912 represents the launch spark timing during vehicle launch.

The seventh plot from the top of FIG. 9 is a plot of launch gear (e.g., a transmission gear that is engaged at the beginning of launch) versus time. The vertical axis represents launch gear and the launch gear value increases in the direction of the vertical axis arrow. The horizontal axis represents time and time increases from the left side of FIG. 9 to the right side of FIG. 9. Trace 914 represents the launch gear.

At time t0, the value of the weighted driving style parameter is low and the vehicle is not being launched. The average vehicle launch acceleration rate is low and the launch hesitation factor value is low. The frequency of downshifting during vehicle acceleration after vehicle launch is low and the launch spark timing value is low. The launch gear is third gear. These conditions are indicative of a low vehicle acceleration rate during engine launch being preferred by the driver. The weighted driving style parameter, average vehicle launch acceleration rate, frequency of downshifting during vehicle acceleration after launch, launch spark timing, and launch gear are learned values that may be determined over a plurality of vehicle drive cycles. In this examples, baseline values are shown for time t0 and the values have not been adjusted responsive to learned driver behavior.

Shortly after time t0 and before time t1, a first vehicle launch with a new driver occurs. Prior to the launch the vehicle speed is reduced to zero and the engine is automatically stopped (not shown). The average vehicle launch acceleration rate increases and so does the launch hesitation factor. The launch spark timing and the launch gear remain at their previous values. A total of three vehicle launches occur between time t0 and time t1. The average vehicle launch rate and launch hesitation factor continue to increase after each vehicle launch after conditions of zero vehicle speed and automatic engine stop occur. Further, the value of the weighted driving style parameter is increased after each vehicle launch to indicate that the driver's behavior indicates intent to increase the vehicle acceleration rate. In addition, the frequency of downshifting after vehicle launch increases.

At time t1, the launch spark timing is advanced and the launch gear is reduced from third gear to second gear to increase the vehicle acceleration rate in response to value of the learned driver behavior exceeding threshold 850. The launch spark timing is advanced and the launch gear is reduced in response to the average launch acceleration rate, the launch hesitation factor, and frequency of downshifting after launch between time t0 and time t1.

Four additional vehicle launches occur between time t1 and time t2. Each of the four launches occurs after conditions of an automatic engine stop and zero vehicle speed have been met without intervening engine stops and starts. The average vehicle launch rate and the launch hesitation factor values change after each vehicle launch. The frequency of downshifting changes a few times and then stabilizes at a constant value. The launch spark timing and launch gear remain constant. The value of the weighted driving style parameter gradually increases in response to the average vehicle launch acceleration rate, the launch hesitation factor, and the frequency of downshifting after vehicle launch.

At time t2, the launch spark timing is advanced a second time and the launch gear is reduced from second gear to first gear to increase the vehicle acceleration rate in response to value of the learned driver behavior exceeding threshold 952. The launch spark timing is advanced and the launch gear is reduced in response to the average launch acceleration rate, the launch hesitation factor, and frequency of downshifting after launch between time t1 and time t2.

Two additional vehicle launches occur between time t2 and time t3. Each of the two launches occur after conditions of an automatic engine stop and zero vehicle speed have been met without intervening engine stops and starts. The average vehicle launch rate is reduced after the first launch after time t2 and the hesitation factor value is also reduced after the first launch after time t2. The frequency of downshifting increases after time t2 and the launch spark timing and launch gear remain constant. The value of the weighted driving style parameter also remains constant between time t2 and time t3.

At time t3, the launch spark timing is retarded and the launch gear is increased from first gear to second gear to decrease the vehicle acceleration rate in response to value of the learned driver behavior falling below threshold 952 at time t3. The launch spark timing is retarded and the launch gear is increased in response to the average launch acceleration rate, the launch hesitation factor, and frequency of downshifting after launch between time t2 and time t3.

In this way, the vehicle launch control parameters may be adjusted in response to learned driver behavior. The learned driver behavior may be manifest in in a value of a weighted driving style parameter and the vehicle launch control parameters may be selected in response to a value of the weighted driving style parameter.

Referring now to FIG. 10, a flow chart of a method for operating an engine and vehicle driveline is shown. The method of FIG. 10 may be incorporated into and may cooperate with the system of FIG. 1. Further, at least portions of the method of FIG. 10 may be incorporated as executable instructions stored in non-transitory memory of a controller while other portions of the method may be performed via a controller transforming operating states of devices and actuators in the physical world.

At 1002, method 1000 determines vehicle operating conditions. Vehicle operating conditions may include, but are not limited to engine speed, driver demand torque, accelerator pedal position, vehicle speed, vehicle acceleration rate, engine operating state (e.g., on (combusting fuel) or off (not combusting fuel)), engine spark timing, and engine fuel injection timing. Method 1000 proceeds to 1004.

At 1004, method 1000 judges whether or not the vehicle is being driven via an autonomous driver. In one example, method 1000 may judge that the vehicle is being driven via an autonomous driver via input received from an autonomous driver or from a value of a variable that is stored in controller memory. If method 1000 judges that the vehicle is being driven via an autonomous driver, the answer is yes and method 1000 proceeds to 1040. Otherwise, the answer is no and method 1000 proceeds to 1006.

At 1040, method 1000 judges if the vehicle is a time sensitive delivery vehicle. A time sensitive delivery vehicle is a vehicle that is scheduled to make deliveries within a predetermined time window (e.g., between 9 A.M. and 5 P.M. during a week day). Method 1000 may judge if the vehicle is a time sensitive delivery vehicle based on data input to an interface via a host server, human, or other means. Alternatively, method 1000 may judge that the vehicle is a time sensitive delivery vehicle responsive to a value of a variable stored in controller memory. If method 1000 judges that the vehicle is a time sensitive delivery vehicle, the answer is yes and method 1000 proceeds to 1042. Otherwise, the answer is no and method 1000 proceeds to 1044.

At 1042, method 1000 adjusts a value of the weighted driving style parameter to a value that provides for rapid vehicle acceleration launch control parameters to be activated (e.g., a third group of vehicle launch control parameters that provides for a rapid acceleration vehicle launch). Such operation may be suitable for delivering inanimate objects (e.g., packages of goods). By activating the third group of vehicle launch control parameters, vehicle acceleration after conditions of zero vehicle speed and an automatic engine stop have been met may be increased so that the vehicle reaches its destinations in a timely manner. In addition, method 1000 may adjust a rate of vehicle acceleration that is requested by the autonomous driver, an amount of time between brake pedal release and accelerator pedal application, and a requested vehicle acceleration rate when the vehicle is not launching from a stop after an automatic engine stop so that the learned driver style will be that of the third level for rapid vehicle acceleration. Method 1000 proceeds to 1008.

At 1044, method 1000 adjusts a value of the weighted driving style parameter to a value that provides for low vehicle acceleration launch control parameters to be activated (e.g., a first group of vehicle launch control parameters that provides for a slow acceleration vehicle launch). By activating the first group of vehicle launch control parameters, vehicle acceleration after conditions of zero vehicle speed and an automatic engine stop have been met may be low so that driveline noise and vibration is low. Such operation may be suitable for delivering animate objects (e.g., persons). In addition, method 1000 may adjust a rate of vehicle acceleration that is requested by the autonomous driver, an amount of time between brake pedal release and accelerator pedal application, and a requested vehicle acceleration rate when the vehicle is not launching from a stop after an automatic engine stop so that the learned driver style will be that of the first level for slow vehicle acceleration. Method 1000 proceeds to 1008.

At 1006, method 1000 identifies a driver via receiving a key or unique data set from a key fob that is held by the driver. The unique data set identifies for the controller which weighted driving style is associated or belongs to the person that is holding the key fob that is proximate to the vehicle. Alternatively, the driver may identify their weighted driving style parameter by providing input to an interface of the controller. Method 1000 activates the vehicle launch control parameters that are associated with the driver that is holding the key fob in proximity of the vehicle.

At 1008, method judges if conditions are present to automatically stop an engine. An engine may be automatically stopped via a controller without a human driver of the vehicle specifically requesting an engine stop via a dedicated input that has a sole purpose of stopping and starting the engine (e.g., an engine stop/start key switch or pushbutton) in response to driver demand torque being less than a threshold torque. Further, the engine may be automatically stopped in response to other vehicle conditions including but not limited to engine temperature greater than a threshold and vehicle speed less than a threshold. If method 1000 judges that conditions are present to automatically stop the engine, the answer is yes and method 1000 proceeds to 1010. Otherwise, the answer is no and method 1000 proceeds to 1030.

At 1030, method 1000 determines a frequency of downshifting during vehicle acceleration. In one example, method 1000 counts an amount of time between when a first time driver requests vehicle acceleration via increasing application of an accelerator pedal and a transmission downshifts from a first gear (e.g., $5^{th}$ gear) to a second gear (e.g., $4^{th}$ gear) and a second time driver requests vehicle acceleration via increasing application of an accelerator pedal and the transmission downshifts from a first gear (e.g., $4^{th}$ gear) to a second gear (e.g., $3^{rd}$ gear). The frequency is determined via the following equation: F=1/T, where F is the frequency and T is the period (e.g., the amount of time between the first transmission downshift during a first vehicle acceleration and the second transmission downshift during a second vehicle acceleration, where there are no intervening vehicle accelerations with downshifting).

In addition, method 1000 determines a driver performance factor 1 ($\varepsilon$) by referencing or indexing a table or function (e.g., FIG. 6) that outputs a value of driver performance factor 1 ($\varepsilon$) when referenced by the frequency of transmission downshifts during vehicle acceleration. Alternatively, the table or function may be referenced by an amount of time between transmission downshifts that occur during vehicle acceleration. A plurality of driver performance factor 1 ($\varepsilon$) values, one determined each time after a vehicle launch is performed based on data observed between vehicle launches, may be stored to controller memory. Method 1000 proceeds to 1032.

At 1032, method 1000 determines a frequency of downshifting by two or more gears during vehicle acceleration. In one example, method 1000 counts an amount of time between when a first time driver requests vehicle acceleration via increasing application of an accelerator pedal and a transmission downshifts by more than one gear from a first gear (e.g., $5^{th}$ gear) to a second gear (e.g., $3^{rd}$ gear) and a second time a driver requests vehicle acceleration via increasing application of an accelerator pedal and the transmission downshifts by more than two gears from a first gear (e.g., $4^{th}$ gear) to a second gear (e.g., $2^{nd}$ gear). The frequency is determined via the following equation: F=1/T, where F is the frequency and T is the period (e.g., the amount of time between the first transmission downshift during a first vehicle acceleration and the second transmission downshift during a second vehicle acceleration, where there are no intervening vehicle accelerations with downshifting of more than one gear).

In addition, method 1000 determines a driver performance factor 2 ($\sigma$) by referencing or indexing a table or function (e.g., FIG. 7) that outputs a value of driver performance factor 2 ($\sigma$) when referenced by the frequency of transmission downshifts of greater than one gear during vehicle acceleration. Alternatively, the table or function may be referenced by an amount of time between transmission downshifts of more than one gear that occur during vehicle acceleration. A plurality of driver performance factor 2 ($\sigma$) values, one determined each time after a vehicle launch is performed based on data observed between vehicle launches, may be stored to controller memory. Method 1000 proceeds to exit.

At 1010, method 1000 ceases delivery of fuel and spark to the engine automatically to stop the engine. Method 1000 proceeds to 1012.

At 1012, method 1000 schedules spark timing for engine starting after the automatic engine stop. Method 1000 also engages a selected transmission gear and schedules fuel injection timing for the next engine start after the automatic engine stop. The spark timing, transmission gear, and fuel injection timing may be retrieved from one or more groups of vehicle launch control parameters that are stored in controller memory for starting an engine and launching a vehicle after an automatic engine stop and vehicle speed being zero. The particular group of vehicle launch control parameters that is extracted from controller memory and activated is determined from a weighted driving style parameter and the weighted driving style parameter is the basis for referencing a function or table that output the group of vehicle launch control parameters that are activated (e.g., FIG. 3). The weighted driving style is associated with a particular human driver as is determined from key fob data or user input. Method 1000 proceeds to 1014 after activating a selected group of vehicle launch control parameters.

At 1014, method 1000 monitors accelerator pedal position and brake pedal position to determine if the engine should be automatically started immediately following the automatic engine stop (e.g., there are no intervening engine stops and starts between the automatic engine stop at 1010 and the automatic engine start at 1020). The accelerator pedal position and brake pedal position may be monitored by monitoring controller inputs. Method 1000 proceeds to 1016.

At 1016, method 1000 judges if the engine should be automatically started and the vehicle launched from zero speed. In one example, method 1000 judges that the engine is to be started and the vehicle launched if the accelerator pedal is applied and the brake pedal is released. In other examples, method 1000 may judge that the engine is to be restarted and the vehicle launched when the accelerator pedal is applied from a released position. If method 1000 judges that the engine is to be restarted and the vehicle launched, the answer is yes and method 1000 proceeds to 1018. Otherwise, the answer is no and method 1000 proceeds to exit.

At 1018, method 1000 determines an amount of time between a brake pedal being fully released and an accelerator pedal application from a released state. In one example, the brake pedal may be determined to be fully released when a brake pedal input value of the controller is less than a threshold value. The accelerator pedal may be determined to be applied when the accelerator pedal input value of the controller is greater than a threshold value. Method 1000 may start a timer to when the brake pedal is fully released. The timer may be stopped when the accelerator pedal is applied. The value of the timer is the amount of time between the brake pedal being fully released and the accelerator pedal being applied. The amount of time between the brake pedal being fully released and the accelerator pedal being applied immediately after conditions are met of an automatic engine stop and zero vehicle speed is the used to index or reference a table or function (e.g., FIG. 4) that outputs a driver launch hesitation factor α. A plurality of driver launch hesitation factors that occur during a plurality of predetermined vehicle launches may be stored in controller memory to determine the value of the weighted driving style γ. Method 1000 proceeds to 1020.

At 1020, method 1000 starts the engine and provides engine torque that is responsive to the accelerator pedal position and the vehicle launch control parameters that are determined from the weighted driving style parameter. The engine is started with spark timing that is equal to the spark timing of the vehicle control parameters that are scheduled and activated at 1012. Further, the transmission is engaged in the gear that was selected at 1012. The engine is started via rotating the engine with the starter motor and supplying fuel and spark to the engine. The torque produced by the engine is a function of the engine spark timing and the amount of fuel supplied to the engine, which is a function of accelerator pedal position. Method 1000 proceeds to 1022.

At 1022, method 1000 determines the average rate of accelerator pedal position increase during a predetermined interval of vehicle launch. In one example, the predetermined interval begins when the accelerator pedal is first applied after the engine is automatically stopped. The predetermined interval ends a predetermined amount of time after the accelerator pedal is first applied after the engine is automatically stopped and a predetermined amount of time (e.g., 10 seconds). Alternatively, the predetermined interval ends when the vehicle reaches a predetermined speed (e.g., 10 KPH) a first time after the accelerator pedal is first applied after the engine is automatically stopped. The average rate of accelerator pedal position increase may be determined by determining the rate of increase in the accelerator pedal position during the predetermined vehicle launch interval a predetermined number of times. Each of the accelerator pedal position rate increases that occur during the predetermined vehicle launch interval may be added with the other accelerator pedal position rate increases that occur during the predetermined vehicle launch interval. The result may be divided by the total number of the accelerator pedal position rate increases that occur during the predetermined vehicle launch interval to determine the average rate of accelerator pedal position increase. A plurality of average rates of accelerator pedal position increases are stored in controller memory in locations that are associated with the present vehicle driver.

The average rate of accelerator pedal increase is used to index or reference a table or function (e.g., FIG. 8) that outputs an accelerator pedal rate factor φ. A plurality of accelerator pedal rate factors that occur during a plurality of predetermined vehicle launches may be stored in controller memory to determine the value of the weighted driving style γ. Method 1000 proceeds to 1024.

At 1024, method 1000 determines the average rate of vehicle acceleration increase that occurs during the predetermined interval of vehicle launch. The average rate of vehicle acceleration increase may be determined by determining the rate of increase in the vehicle's acceleration rate during the predetermined vehicle launch interval a predetermined number of times. Each of the vehicle acceleration rate increases that occur during the predetermined vehicle launch interval may be added with the other vehicle acceleration rate increases that occur during the predetermined vehicle launch interval. The result may be divided by the total number of the vehicle acceleration rate increases that occur during the predetermined vehicle launch interval to determine the average vehicle acceleration rate increase. The average vehicle acceleration rate may then be used to index or reference a table or function (e.g., FIG. 5) that outputs a vehicle launch acceleration rate factor δ. A plurality of vehicle launch acceleration rate factors determined from a plurality of predetermined vehicle launches may be stored in controller memory locations that are associated with the vehicle's present driver to determine the value of the weighted driving style γ. Method 1000 proceeds to 1026.

At 1026, method 1000 determines and saves the weighted driving style to controller memory. In one example, the weighted driving style parameter is determined via the following equation:

$$\gamma = \sum \left[ \beta 0 \cdot \frac{\alpha 1 + \alpha 2 + \ldots \alpha n}{n} \right] + \left[ \beta 1 \cdot \frac{\delta 1 + \delta 2 + \ldots \delta n}{n} \right] + \left[ \beta 2 \cdot \frac{\varepsilon 1 + \varepsilon 2 + \ldots \varepsilon n}{n} \right] + \left[ \beta 3 \cdot \frac{\sigma 1 + \sigma 2 + \ldots \sigma n}{n} \right] + \left[ \beta 4 \cdot \frac{\varphi 1 + \varphi 2 + \ldots \varphi n}{n} \right]$$

where γ is the weighted driving style parameter, β0 is a weighting factor for an amount of time between brake pedal release and accelerator pedal application after an automatic engine stop while vehicle speed is zero, α1-αn are times between brake pedal release and accelerator pedal application after an automatic engine stop while vehicle speed is zero 1-n, n is a total number of values used to determine an average of values, β1 is a weighting factor for a driver launch acceleration rate factor, δ1-δn are driver launch acceleration factors 1-n, β2 is a weighting factor for driver performance factor 1, ε1-εn are driver performance factor 1 values 1-n, $\beta3$ is a weighting factor for driver performance factor 2, and $\sigma1$-$\sigma n$ are driver performance factor 2 values 1-n, $\beta4$ is a weighting factor for the accelerator pedal rate, and $\varphi1$-$\varphi n$ are accelerator pedal rate factors 1-n. The values of $\beta0$-$\beta4$ may be empirically determined and stored in controller memory. In one example, the weighting factor $\beta1$ for the driver launch acceleration rate factor $\delta$ may be weighted more heavily than weighting factors $\beta0$, $\beta2$, and $\beta3$. Further, the weighting factor $\beta4$ for the accelerator pedal rate factor $\varphi$ may be weighted more heavily than weighting factor $\beta1$. The values of $\alpha2$-$\alpha n$, $\delta2$-$\delta n$, $\varepsilon2$-$\varepsilon n$, $\sigma2$-$\sigma n$, and $\varphi2$-$\varphi n$ are values that are stored in controller memory from previous vehicle launches after conditions of an automatic engine stop and zero vehicle speed have been met. Unique $\alpha2$-$\alpha n$, $\delta2$-$\delta n$, $\varepsilon2$-$\varepsilon n$, $\sigma2$-$\sigma n$, $\varphi2$-$\varphi n$, $\gamma$, and $\beta0$-$\beta4$ values are stored in unique memory locations that are associated with the present vehicle driver that is holding the key fob or the autonomous driver.

Thus, the value of the weighted driving style parameter $\gamma$ is a sum of averages of parameters that are multiplied by weighting factors. In this example, the weighted driving style parameter $\gamma$ is determined from five parameters. However, the weighted driving style parameter value $\gamma$ may be determined by less than or more than five parameters, if desired. Method 1000 determines the value of $\gamma$ and stores it to controller memory.

In this way, a driver's style of driving may be characterized as a weighted driving style parameter. The weighted driving style parameter may be based on a plurality of parameters that are learned during predetermined vehicle launch intervals that occur after conditions of an automatic engine stop and vehicle speed of zero are reached.

The method of FIG. 10 provides for a method for operating a vehicle, comprising: adjusting launch of a vehicle via a controller, including transmission gear selection, via a learned driver behavior and an identified present vehicle driver. The method includes where adjusting launch of the vehicle includes adjusting spark timing of an engine. The method includes where a numeric value represents the learned driver behavior, and further comprising selecting a group of control parameters from the learned driver behavior. The method includes where the numeric value is a weighted sum of a plurality of parameters that are generated from a plurality of vehicle launches and non-launch conditions. The method includes where the non-launch conditions include a frequency of downshifting during vehicle acceleration. The method includes where the non-launch conditions include a frequency of downshifting two or more gears during vehicle acceleration. The method includes where the launch of the vehicle includes vehicle conditions including an automatic engine stop and zero vehicle speed.

The method of FIG. 10 also provides for a method for operating a vehicle, comprising: automatically stopping an engine; shifting a transmission that is coupled to the engine to a gear according to a learned driving style, the learned driving style a function of parameters learned during prior vehicle launches; automatically starting the engine; and launching a vehicle via power supplied from the engine to the transmission, the transmission engaged in the gear. The method further comprises adjusting the power supplied from the engine as a function of the learned driving style. The method includes where adjusting the power includes reducing the power supplied from the engine as a function of time between releasing a brake pedal and applying an accelerator pedal. The method includes where adjusting the power includes increasing the power supplied from the engine as a function of time between releasing a brake pedal and applying an accelerator pedal. The method includes where adjusting the power includes increasing the power supplied from the engine as a function of frequency of downshifting during vehicle acceleration. The method includes where the parameters learned during prior vehicle launches include rate of accelerator pedal increase. The method includes where the parameters learned during prior vehicle launches include vehicle acceleration rate.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
    adjusting launch of the vehicle, including transmission gear selection, via a learned driver behavior and an identified present vehicle driver, where a numeric value represents the learned driver behavior, and where the numeric value is a weighted sum of a plurality of parameters that are generated from a plurality of vehicle launches and non-launch conditions; and
    selecting a group of control parameters from the learned driver behavior.

2. The method of claim 1, where adjusting launch of the vehicle includes adjusting spark timing of an engine.

3. The method of claim 1, where the non-launch conditions include a frequency of downshifting during vehicle acceleration.

4. The method of claim 1, where the non-launch conditions include a frequency of downshifting two or more gears during vehicle acceleration.

5. The method of claim 1, where the launch of the vehicle includes vehicle conditions including an automatic engine stop and zero vehicle speed.

6. A method for operating a vehicle, comprising:
    automatically stopping an engine;
    shifting a transmission that is coupled to the engine to a gear according to a learned driving style, the learned driving style being a function of parameters learned during prior vehicle launches;
    automatically starting the engine; and
    launching the vehicle via power supplied from the engine to the transmission, the transmission engaged in the gear.

7. The method of claim 6, further comprising adjusting the power supplied from the engine as a function of the learned driving style.

8. The method of claim 6, where adjusting the power supplied from the engine includes reducing the power supplied from the engine as a function of time between releasing a brake pedal and applying an accelerator pedal.

9. The method of claim 6, where adjusting the power supplied from the engine includes increasing the power supplied from the engine as a function of time between releasing a brake pedal and applying an accelerator pedal.

10. The method of claim 6, where adjusting the power supplied from the engine includes increasing the power supplied from the engine as a function of frequency of downshifting during vehicle acceleration.

11. The method of claim 6, where the parameters learned during prior vehicle launches include rate of accelerator pedal increase.

12. The method of claim 11, where the parameters learned during prior vehicle launches include vehicle acceleration rate.

* * * * *